US009176351B2

(12) United States Patent
Nagano et al.

(10) Patent No.: US 9,176,351 B2
(45) Date of Patent: Nov. 3, 2015

(54) LIQUID CRYSTAL DISPLAY APPARATUS

(75) Inventors: Shingo Nagano, Tokyo (JP); Shigeaki Noumi, Tokyo (JP); Osamu Miyakawa, Kumamoto (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 9 days.

(21) Appl. No.: 13/423,448

(22) Filed: Mar. 19, 2012

(65) Prior Publication Data
US 2012/0249916 A1 Oct. 4, 2012

(30) Foreign Application Priority Data
Mar. 28, 2011 (JP) ................................. 2011-070423

(51) Int. Cl.
| G02F 1/1345 | (2006.01) |
| G02F 1/1339 | (2006.01) |
| G02F 1/1343 | (2006.01) |
| G02F 1/1362 | (2006.01) |

(52) U.S. Cl.
CPC ............ *G02F 1/1345* (2013.01); *G02F 1/1339* (2013.01); *G02F 1/134363* (2013.01); *G02F 2001/134372* (2013.01); *G02F 2001/136218* (2013.01)

(58) Field of Classification Search
CPC ................ G02F 1/1345; G02F 1/1339; G02F 1/134363; G02F 2001/134372
USPC ..................... 349/149–153, 139; 345/104, 90
See application file for complete search history.

(56) References Cited

U.S. PATENT DOCUMENTS

| 5,696,566 | A | * | 12/1997 | Kim et al. ........................ 349/39 |
| 5,739,880 | A | * | 4/1998 | Suzuki et al. .................. 349/110 |
| 7,671,957 | B2 | | 3/2010 | Aoki et al. |
| 2004/0135941 | A1 | * | 7/2004 | Nam et al. ..................... 349/110 |

(Continued)

FOREIGN PATENT DOCUMENTS

| JP | 2001-183696 | 7/2001 |
| JP | 2005-275054 | 10/2005 |
| JP | 2008-26869 | 2/2008 |
| JP | 2009-122502 | 6/2009 |

(Continued)

OTHER PUBLICATIONS

Office Action issued Oct. 14, 2014, in Japanese Patent Application No. 2011-070423 (with English-language translation).

(Continued)

*Primary Examiner* — Michael Caley
*Assistant Examiner* — Jia Pan
(74) *Attorney, Agent, or Firm* — Oblon, McClelland, Maier & Neustadt, L.L.P.

(57) ABSTRACT

A liquid crystal display apparatus includes: an array substrate; a seal material; and an opposite substrate, wherein the array substrate includes: a plurality of thin film transistors formed in correspondence to respective intersection parts of a plurality of gate wirings and a plurality of source wirings; a pixel electrode connected to the thin film transistor; an opposite electrode formed to face the pixel electrode; a gate extraction wiring that connects the gate wirings and a connection terminal formed in an outer area of the seal material; a conductive film that covers the gate extraction wiring with sandwiching a first insulation film therebetween; and a second insulation film that covers the conductive film in at least part of the outer area of the seal material, and wherein the conductive film is applied with an electrical potential of the opposite electrode.

13 Claims, 8 Drawing Sheets

(56) References Cited

U.S. PATENT DOCUMENTS

| | | |
|---|---|---|
| 2007/0296674 A1* | 12/2007 | Aoki et al. .................... 345/94 |
| 2008/0049156 A1* | 2/2008 | Kim et al. .................... 349/40 |
| 2009/0128721 A1* | 5/2009 | Kawasaki et al. ............ 349/34 |
| 2009/0207362 A1 | 8/2009 | Nagano et al. |
| 2009/0230401 A1 | 9/2009 | Nagano et al. |
| 2009/0268145 A1* | 10/2009 | Anjo et al. ................... 349/141 |
| 2010/0173433 A1* | 7/2010 | Park et al. .................... 438/27 |

FOREIGN PATENT DOCUMENTS

| | | |
|---|---|---|
| JP | 2009-265484 | 11/2009 |
| JP | 2010-49185 | 3/2010 |

OTHER PUBLICATIONS

Office Action issued Jan. 6, 2015 to Japanese Patent Application No. 2011-070423, with English translation.

* cited by examiner

LIQUID CRYSTAL DISPLAY APPARATUS

CROSS-REFERENCE TO RELATED APPLICATION

This application claims priority from Japanese Patent Application No. 2011-070423 filed on Mar. 28, 2011, the entire subject matter of which is incorporated herein by reference.

TECHNICAL FIELD

This disclosure relates to a liquid crystal display apparatus. More specifically, this disclosure relates to improvements on visual quality and reliability of a horizontal electric-field type liquid crystal display apparatus.

BACKGROUND

In recent years, a new display apparatus having a thin and planar display panel using liquid crystals, electroluminescence, charged fine particles and the like has been widely used instead of the conventional cathode-ray tube. A liquid crystal display apparatus representative of the new display apparatus has not only thin and lightweight properties but also low power consumption and low voltage driving characteristics. The liquid crystal display apparatus has the liquid crystals that are sealed between two substrates. One substrate is an array substrate having a display area in which a plurality of pixels is arranged in a matrix shape, and the other substrate is an opposite substrate that is formed with a color filter, a black matrix (light shield film) and the like. The array substrate and the opposite substrate are bonded with a seal material.

Specifically, since a thin film transistor (TFT) type liquid crystal display apparatus has TFTs, which are switching elements, in respective pixels on the array substrate, the respective pixels can have voltages independently driving the liquid crystals, and thus it is possible to display a high-quality image with less crosstalk. Also, each pixel is provided with a gate wiring (scanning wiring) that controls on-off operations of the TFT and a source wiring (signal wiring), which intersecting with the gate wiring, to input image data. Typically, each pixel corresponds to an area that is surrounded by the gate wirings and the source wirings.

In an in-plane switching (IPS) type (horizontal electric-field type) liquid crystal display apparatus, a plurality of pixel electrodes and opposite electrodes (common electrodes) are arranged alternately at an interval in a slit shape or pectinate shape, as viewed from a plan view, on the same layer or different layer on one array substrate. A generally horizontal electric-field is applied to a substrate surface, and thus an image is displayed. The IPS type has an improved viewing angle characteristic, compared to the conventional TN (Twisted Nematic) type. However, the IPS type has a lower light transmissivity, compared to the TN type, because the electrode parts of the pixel electrodes and opposite electrodes do not mostly contribute to the display.

It is known that an improved horizontal electric-field type apparatus, such as a fringe field switching (FFS) type (for example, JP-A-2009-265484 and JP-A-2010-049185. In a broader interpretation, it is described that the FFS type is also the IPS type). In the FFS type liquid crystal display apparatus, the pixel electrodes and the opposite electrodes are formed on one array substrate, like the IPS type. However, the pixel electrodes and the opposite electrodes are arranged with being overlapped vertically with sandwiching an insulation film therebetween. Also, generally, the lower electrode has a plate (plane) shape and the upper electrode has a slit shape or pectinate shape having an opening.

In the FFS type, the pixel electrode is any one of the lower electrode and the upper electrode. In the FFS type, since the liquid crystals are driven by the fringe electric-field between the upper and lower electrodes, the liquid crystals above the electrode parts of the upper electrodes are also driven to contribute to the display. Thereby, the light transmissivity is improved, compared to the IPS type.

SUMMARY

However, as described in JP-A-2009-265484 and JP-A-2010-049185, in the horizontal electric-field type, a surface of the opposite substrate facing the liquid crystals is made of an insulation film such as black matrix, overcoat, color filter and the like, which are made of organic resin, and a transparent conductive film of the opposite electrode (common electrode), like the TN type, is not provided. Therefore, in the horizontal electric-field type, the opposite substrate causes potential variation due to the electric-field generated from a gate extraction wiring on the array substrate, so that display non-uniformity occurs in the vicinity of the display area adjacent to the gate extraction wirings.

In view of the above, JP-A-2009-265484 and JP-A-2010-049185 describe that a shield electrode (conductive film) for electric-field shield is arranged on the gate extraction wirings of the array substrate from a display area end to an area of the seal material, with sandwiching the insulation film, thereby improving the display non-uniformity. However, the shield electrode on the gate extraction wirings is arranged in only a part of the area of the seal material. Thus, it is not possible to sufficiently shield the electric-field, which is generated from the gate extraction wirings, in an area in which the shield electrode is not provided, depending on layer configurations of the array substrate and the opposite substrate, member characteristics and driving conditions. Thereby, the opposite substrate causes the potential variation, so that the display non-uniformity still occurs in the vicinity of the display area adjacent to the gate extraction wirings.

Also, when the shield electrode is made to extend to an outer area of the seal material, the shield electrode contacts moistures in the atmosphere in a configuration, in which the shield electrode is provided on the uppermost layer of the insulation film. As a result, the shield electrode may be corroded.

This disclosure provides at least a horizontal electric-field type liquid crystal display apparatus having a configuration capable of suppressing display non-uniformity in the vicinity of a display area adjacent to gate extraction wirings more efficiently, compared to the related art, and capable of suppressing corrosion of a shield electrode shielding a leakage electric-field generated from the gate extraction wirings.

In view of the above, a liquid crystal display apparatus comprises: an array substrate that has a display area; a seal material that is formed to surround the display area; and an opposite substrate that is arranged to face the array substrate with sandwiching liquid crystals therebetween, the liquid crystals being sealed in an area surrounded by the seal material, wherein the array substrate includes: a plurality of thin film transistors that is formed in correspondence to respective intersection parts of a plurality of gate wirings and a plurality of source wirings arranged in the display area; a pixel electrode that is connected to the thin film transistor; an opposite electrode that is formed to face the pixel electrode; a gate extraction wiring that connects the gate wirings and a connection terminal formed in an outer area of the seal material;

a conductive film that covers the gate extraction wiring with sandwiching a first insulation film therebetween; and a second insulation film that covers the conductive film in at least part of the outer area of the seal material, and wherein the conductive film is applied with an electrical potential of the opposite electrode.

According to this disclosure, a horizontal electric-field type liquid crystal display apparatus may have a configuration capable of suppressing display non-uniformity in the vicinity of the display area adjacent to the gate extraction wirings more efficiently, compared to the related art and capable of suppressing corrosion of the shield electrode shielding a leakage electric-field generated from the gate extraction wirings.

BRIEF DESCRIPTION OF THE DRAWINGS

The foregoing and additional features and characteristics of this disclosure will become more apparent from the following detailed descriptions considered with the reference to the accompanying drawings, wherein.

SUMMARY

Figure 1:
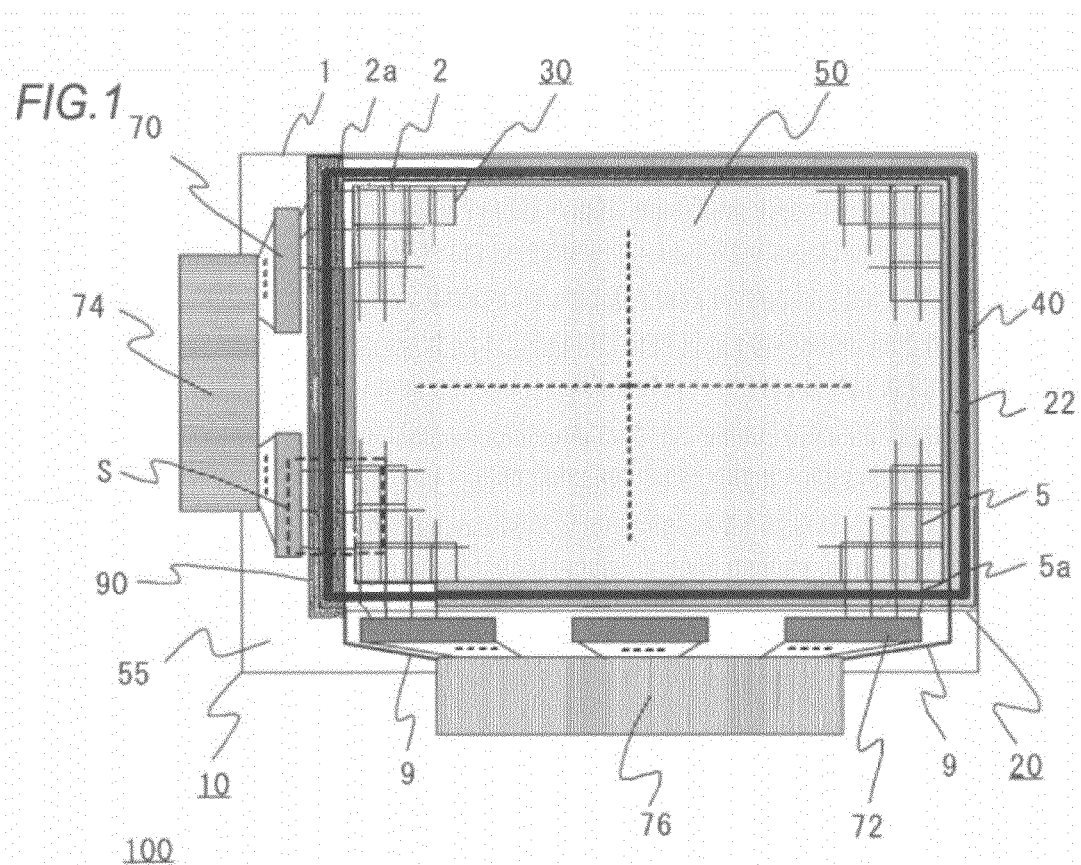
FIG. 1 is a schematic plan view illustrating a liquid crystal display apparatus of a first illustrative embodiment.

Hereinafter, illustrative embodiments of a liquid crystal display apparatus of this disclosure will be described with reference to the drawings. In the meantime, the same reference numerals in the respective drawings for describing the illustrative embodiments indicate the same or equivalent elements and the overlapped descriptions will be appropriately omitted.

First Illustrative Embodiment

First, a configuration of a liquid crystal display apparatus of this disclosure is briefly described. FIG. 1 is a schematic plan view illustrating a liquid crystal display apparatus of a first illustrative embodiment.

A liquid crystal display apparatus 100 has a plurality of pixels 30 that is arranged in a matrix shape in a display area 50. Also, the liquid crystal display apparatus has a liquid crystal display panel that is formed by bonding an array substrate 10, which has gate wirings 2, source wirings 5, TFTs and pixel electrodes (not shown) configuring the pixels 30 and common wirings 9 formed in the vicinity of an outer side of the display area 50, and an opposite substrate 20, which is arranged to face the array substrate 10 with sandwiching liquid crystals therebetween, having a color filter, a black matrix 22 and the like formed thereon. Although not shown, a deflection plate and a phase plate are bonded on respective surfaces of the liquid crystal panel and a backlight, an external circuit, a housing and the like are attached on the surfaces, so that the liquid crystal display apparatus 100 is completed.

The array substrate 10 is divided into the display area 50 and a frame area 55 at the outer side of the display area 50 on an insulating substrate 1 such as plastics. In the frame area 55, gate wiring driving circuits 70 and source wiring driving circuits 72 are mounted on a plurality of connection terminals (not shown) by a COG (Chip On Glass) mounting technology. Also, ends of the insulating substrate 1 are provided with a plurality of connection terminals (not shown) for flexible substrates 74, 76, which are connected to external circuits that supply control signals, clocks, image data, driving voltages and the like to the gate wiring driving circuits 70 and source wiring driving circuits 72.

Meanwhile, although there are a plurality of gate extraction wirings 2a or source extraction wirings 5a, which extend from the gate wirings 2 or source wirings 5 of the display area 50 to output parts of the gate wiring driving circuits 70 or source wiring driving circuits 72 with passing the seal material 40, and a plurality of input wirings connect input parts of the gate wiring driving circuits 70 or source wiring driving circuits 72. Although, the plurality of connection terminals for flexible substrates 74, 76 provided at the end portions of the insulating substrate 1, only parts thereof are shown in FIG. 1 so as to simplify the drawing. Also, a conductive film 90 that will be described later is arranged above the gate extraction wirings 2a.

In a small-sized panel, the total number of wirings is relatively small. Therefore, a driving circuit having integrated the gate wiring driving circuits 70, and the source wiring driving circuits 72 is used in many cases. Also, the flexible substrates 74, 76 are integrated into one piece in many cases.

Figure 2:
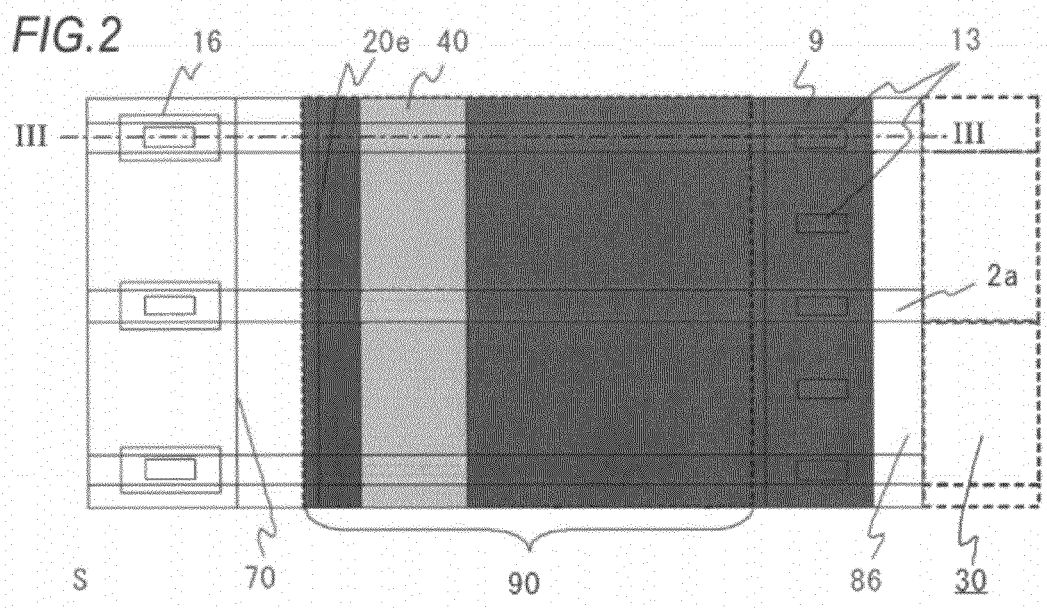
FIG. 2 is an enlarged plan view illustrating an adjacent area S of a seal material of FIG. 1.
Figure 3:
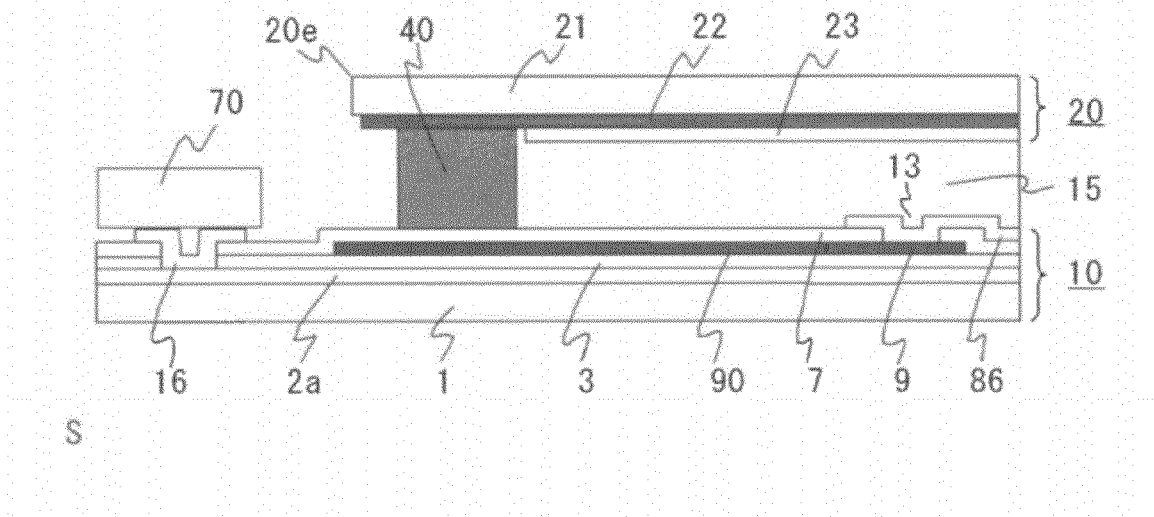
FIG. 3 is a sectional view taken along a line III-III of FIG. 2.

FIG. 2 is an enlarged plan view illustrating an adjacent area S of a seal material of the liquid crystal display apparatus shown in FIG. 1. FIG. 3 is a sectional view taken along a line III-III of FIG. 2.

Additionally, in FIG. 2, the black matrix 22, the overcoat 23 and the like of the opposite substrate 20 are not shown so as to simplify the drawing. Also, the pixels 30 of the display area 50 shown by the dotted line at the right side of FIG. 2 are arranged in a matrix shape. A detailed configuration of the pixel 30 will be described later.

The gate extraction wiring 2a is covered with a gate insulation film 3 as a first insulation film. The common wiring 9 is formed at the same layer as the source wiring 5 on the gate insulation film 3, and a common potential, which is an electrical potential of the opposite electrode, is applied to the common wiring 9. In the first illustrative embodiment, the common wiring 9 also becomes the conductive film 90 as the same layer extending toward a connection terminal 16. The conductive film 90 serves as a shield electrode that shields an electric-field generated from the gate extraction wiring 2a.

In an inner area of the seal material 40, the conductive film 90 is preferably formed to cover the gate extraction wiring 2a over the substantially entire part thereof from the end portion of the display area 50, in terms of shielding the electric-field generated from the gate extraction wiring 2a. Also, the conductive film 90 is characterized in that it extends from the adjacency of the end portion of the display area 50 to an outer area of the seal material 40.

The seal material 40 has a seal function of bonding the array substrate 10 and the opposite substrate 20 and enclosing liquid crystals 15 therebetween. In general, the seal material 40 made of epoxy resin and the like and is classified into heat-curing and photo-curing resins. Regarding the seal material 40, it is required for a material of the liquid crystals 15 that the impurities is not melt and leaked out. Usually, a permittivity $\in$ of the seal material 40 is around 4. Therefore, if the conductive film 90 is formed including a part of the seal material 40, the area of the seal material 40 has an area, in which the conductive film 90 shielding the electric-field from the gate extraction wiring 2a does not exist. Thereby, the electric-field generated from the gate extraction wiring 2a still have an effect on the opposite substrate 20.

However, in the first illustrative embodiment, the conductive film 90 extends to the outer area of the seal material 40. Therefore, the conductive film 90 exists over the entire area of the seal material 40 above the gate extraction wiring 2a, so that it is possible to remove most of the influence of the electric-field generated from the gate extraction wiring 2a on the opposite substrate 20.

The outer area of the seal material 40 between the array substrate 10 and the opposite substrate 20 is usually atmospheric, and thus a permittivity $\in$ of 1. Accordingly, the influence of the electric-field generated from the gate extraction wiring 2a to the opposite substrate 20 becomes small. However, as viewed from a plan view, it is preferable that the conductive film 90 is formed to extend to the connection terminal 16 with passing a position of an end portion 20e of the opposite substrate of a side of the gate extraction wiring 2a. Thereby, it is possible to suppress the influence of the electric-field generated from the gate extraction wiring 2a on the opposite substrate 20 still more efficiently.

In at least part of the outer area of the seal material 40, a protective film 7 as a second insulation film covers the conductive film 90. Thereby, the conductive film 90 is covered with the protective film 7, so that it does not contact moistures in the atmosphere. Therefore, even when the conductive film 90 is made of a metal film susceptible to the corrosion, it is possible to suppress the corrosion.

Also, since the seal material 40 is bonded to the protective film 7 made of an inorganic film such as oxide film and nitride film, an insulation film such as organic resin, or a stacked film thereof, it has higher adhesion to the array substrate 10, compared to the adhesion to a transparent oxide conductive film such as ITO (Indium Tin Oxide).

On the array substrate 10, on which the gate wiring driving circuits 70 are mounted, the connection terminals 16 that are COG-connected to output terminals of the gate wiring driving circuits 70 are formed. The connection terminal 16 is connected to the gate extraction wiring 2a through a contact hole provided in the gate insulation film 3 and protective film 7. The connection terminal 16 is formed at the same layer as the upper electrode that is made of a transparent oxide conductive film such as ITO of the pixel 30 (which will be described later).

Also, as specifically described below, a connection part 86, which is formed at the same layer formed by extending the upper electrode of the pixel 30, and the common wiring 9 are connected to each other through a contact hole 13 provided in the protective film 7, and then the common potential is applied to the upper electrode.

The opposite substrate 20 is formed with the black matrix 22 made of black organic resin, the overcoat 23 made of a transparent organic resin, the color filters, alignment films (not shown) and the like on an insulating substrate 21 made of glass, plastics and the like. Usually, each pixel 30 corresponds to one of the color filters based on three primary colors of red, blue and green.

Color filters based on four or more primary colors may be used so as to improve color reproducibility.

In the general horizontal electric-field type liquid crystal display apparatus 100, since a side of the opposite substrate 20 facing the liquid crystals 15 is not formed with an opposite electrode (common electrode) made of a transparent oxide conductive film such as ITO, the side facing the liquid crystal 15 is made of only an insulation film being a dielectric. Accordingly, when the shield electrode that shields the leakage electric-field generated from the gate extraction wiring 2a is not provided, the insulating substrate 21, the black matrix 22, the overcoat 23, the color filters and the like of the opposite substrate 20 cause the potential variation by the electric-field generated from the gate extraction wirings 2a, so that the display non-uniformity occurs in the vicinity of the display area 50 adjacent to the gate extraction wirings 2a.

Figure 4:
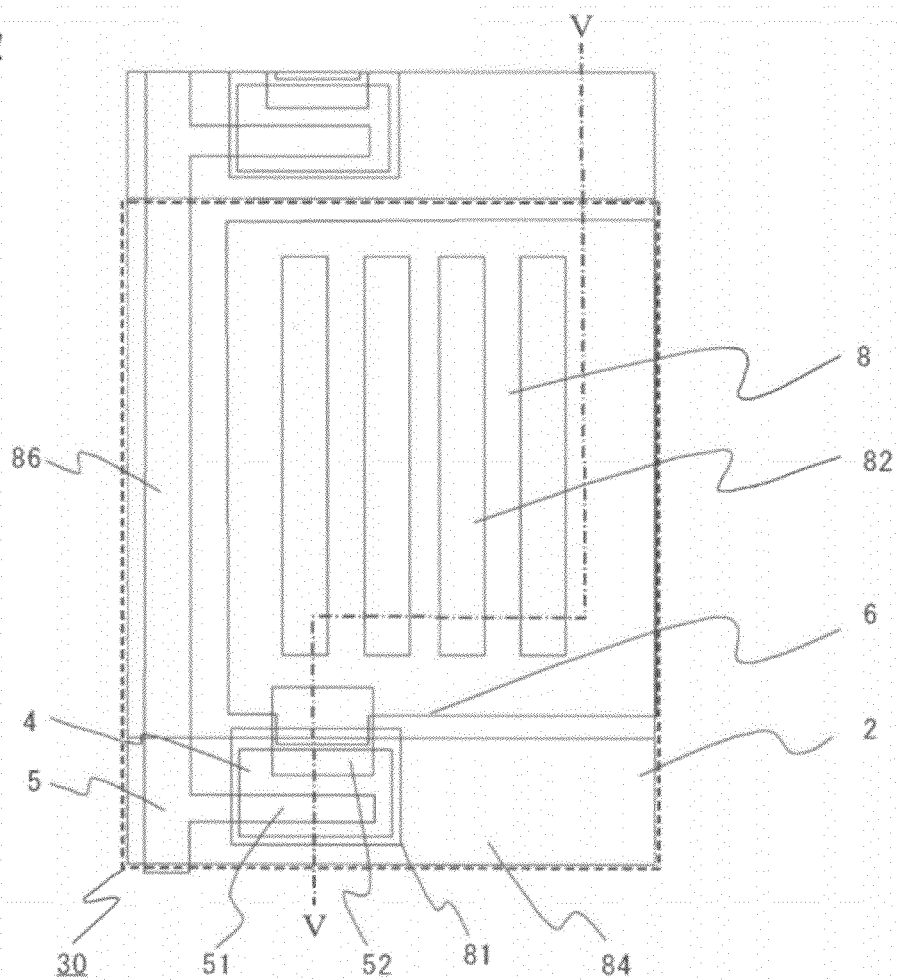
FIG. 4 is an enlarged plan view illustrating a pixel on an array substrate of the liquid crystal display apparatus of the first illustrative embodiment.
Figure 5:
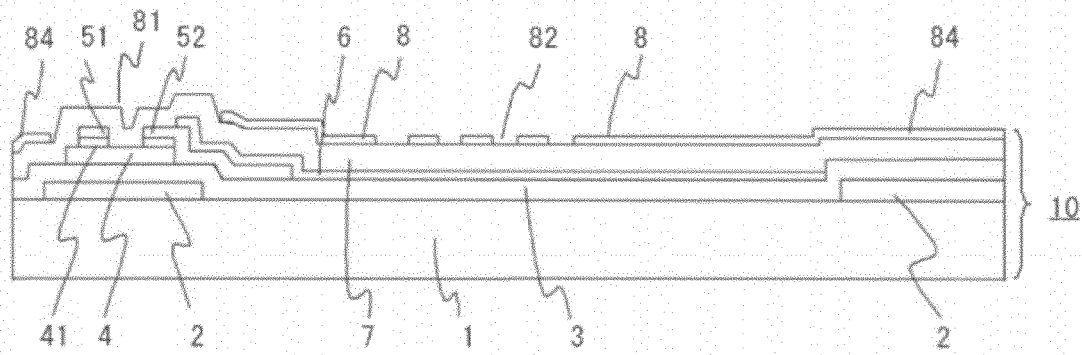
FIG. 5 is a sectional view taken along a line V-V of FIG. 4.

FIG. 4 is an enlarged plan view illustrating a pixel on the array substrate of the liquid crystal display apparatus of the first illustrative embodiment. FIG. 5 is a sectional view taken along a line V-V of FIG. 4.

The pixel 30 of the first illustrative embodiment has an electrode configuration, in which a lower electrode 6 is the pixel electrode and an upper electrode 8 is the opposite electrode in the FFS type liquid crystal display apparatus 100.

The gate wiring 2, the gate extraction wiring 2a and the like made of metal such as Al, Cr, Mo, Ti, Ta, W, Ni, Cu, Au and Ag or alloy or stacked film thereof are formed on the insulating substrate 1 of glass, plastics and the like.

Then, the upper layer thereof is covered with the gate insulation film 3 made of an inorganic film such as oxide film, nitride film and the like. Also, a semiconductor film 4 and an ohmic contact film 41, which is formed by implanting impurities in the semiconductor film, are stacked and formed into an island shape on a part of the gate insulation film 3 on the gate wiring 2.

Then, the source wiring 5, the source extraction wiring 5a and the like made of metal such as Al, Cr, Mo, Ti, Ta, W, Ni, Cu, Au and Ag or alloy or stacked film thereof are formed on the gate insulation film 3 so that they intersect with the gate wiring 2.

At this time, the common wiring 9 and the conductive film 90 made of the same layer as the source wiring 5 are formed at the same time.

Also, a source electrode 51 and a drain electrode 52 formed at the same layer as the source wiring 5 are formed to overlap with the ohmic contact film 41. The ohmic contact film 41 exposed from the source electrode 51 and drain electrode 52 is removed. The ohmic contact film 41 between the source electrode 51 and drain electrode 52 is also removed, and thus a channel part of a TFT is formed. The gate wiring 2 below the channel part serves as a gate electrode, and a TFT as a switching element is formed.

In the meantime, the semiconductor film 4 and the ohmic contact film 41 may be formed not only in the TFT area but also along the source wiring, so that they are arranged below the source wiring 5. Also, the semiconductor film 4 and the ohmic contact film 5 may be formed in an island shape at an intersection part of the gate wiring 2 and the source wiring 5, so as to suppress the breaking of the source wiring 4.

The plate-shaped lower electrode 6 is a pixel electrode, and the electrode is made of a transparent oxide conductive film such as ITO in case of a transmissive type. In a reflective type, the lower electrode is made of metal such as Al, Ag and Pt or alloy or stacked film thereof, and a surface thereof may be made of a conductive film having high reflectivity. A part of the lower electrode 6 is formed on the drain electrode 52 with stacked and is electrically connected thereto. In the meantime, a part of the lower electrode 6 may be formed at a lower layer of the drain electrode 52 and electrically connected thereto.

An upper layer of the source wiring 5, the TFT, the lower electrode 6 and the like is covered with the protective film 7 that is made of an inorganic film such as oxide film and nitride film, an insulation film of organic resin or a stacked film thereof.

The upper electrode 8 made of a transparent oxide conductive film such as ITO is formed on the protective film 7. The upper electrode 8 has a slit shape (opening shape) having openings 82, a pectinate shape (one side of the opening 82 is an open end) or a stripe shape. The upper electrode 8 is the opposite electrode, and the common potential is applied thereto. The upper electrode 8 generates a fringe electric-field between the lower electrode 6 and the upper electrode 8 through the protective film 7 in areas of the openings 82, thereby driving the liquid crystals 15.

Also, in the first illustrative embodiment, the upper electrode 8 of the opposite electrode is connected to the upper electrodes 8 of the adjacent pixels 30 by connection parts 84 and 86, which formed at the same layer as the upper electrode 8, in the source wiring 5 (upper-lower) direction and gate wiring 2 (left-right) direction, respectively. The connection parts 84 and 86 cover the substantial entire area of the gate wiring 2 and source wiring 5 and are formed into a grating (mesh) shape, so that they lower the resistance of the upper electrode 8 and shield the electric-field from the gate wiring 2 and source wiring 5 to the liquid crystals 15.

Also, an opening 81 is provided at the upper electrode 8 on the TFT or connection parts 84 and 86. This is to suppress the common potential of the upper electrode 8 from influencing the TFT characteristics. However, the opening 81 is also a cause of the electric-field leakage from the gate wiring 2 to the liquid crystals 15. Therefore, it is preferable to minimize a size of the opening 81, or the opening 81 may not be provided on the TFT.

Also, the connection parts 84 and 86, which is formed at the same layer as the upper electrode 8 of the pixel 30 at the periphery of the display area 50, are made to extend continuously, and the connection parts 84 and 86 are connected to the common wiring 9 through the contact hole 13 provided in the protective film 7 in the inner area of the seal material 40 from the end portion of the display area 50. The connection part 86 that is arranged between the end portion of the display area 50 and the common wiring 9 has also the function of shielding the electric-field from the gate extraction wiring 2a. Also, it is possible to suitably design a size, a shape, the number and a position of the contact hole 13. For example, in FIG. 2, the contact holes are formed in areas of both sides on the common wiring 9 between the adjacent gate extraction wirings 2a. Thereby, it is possible to apply the common potential to the upper electrode 8 of the opposite electrode from the common wiring 9 via the connection part 86.

Also, since the connection parts 84 and 86 in the display area 50 have the effect of shielding the electric-field from the gate wirings 2 and the source wirings 5 to the liquid crystals 15, they function as a light shield film in a normally black mode of the horizontal electric-field type. According to this configuration, it is possible to omit the black matrix 22 that is usually provided along the gate wirings 2 or source wirings 5 formed in the display area 50 of the opposite substrate 20.

In the meantime, the connection parts 84 and 86 in the display area 50 may be formed in only one direction of the source wiring 5 (upper-lower) direction and the gate wiring 2 (left-right) direction and may be connected to the upper electrode 8 of the adjacent pixel 30.

In the assembling process of the liquid crystal panel, the alignment films (not shown) made of organic resins such as polyimide are applied to the array substrate 10 and the opposite substrate 20, and then an orientation process is performed by using the rubbing or photo-alignment technique so that molecules of the liquid crystals 15 are directed in a predetermined direction.

The array substrate 10 and the opposite substrate 20 are overlapped so that the alignment films thereof face each other and have a gap of about several micro-meters therebetween by a spacer member (not shown) made of organic resin and the like, and then they are bonded by the seal material 40 formed to surround the display area 50. The liquid crystals 15 are sealed in the inner gap of the seal material 40.

A polarization plate and a phase plate are bonded on both surfaces of the liquid crystal panel formed as described above, and the driving circuits 70 for scanning lines, the driving circuits 72 for signal lines and the flexible substrates 74, 76 are mounted. An external circuit for supplying various electric signals to the liquid crystal panel and a backlight unit are attached on a backside of the liquid crystal panel (in the transmissive type) and accommodated in a housing, and thus the liquid crystal display apparatus 100 is completed.

As described above, in the first illustrative embodiment 1, the conductive film 90 is provided on the gate extraction wirings 2a even in at least part of the outer area of the seal material 40. Therefore, compared to the related art, it is possible to suppress the influence of the electric-field from the gate extraction wirings 2a on the opposite substrate 20.

Since the conductive film 90 is covered with the protective film 7 in at least part of the outer area of the seal material 40, the conductive film does not contact the moistures in the atmosphere, so that it is possible to suppress the corrosion of the conductive film 90.

Second Illustrative Embodiment

Figure 6:
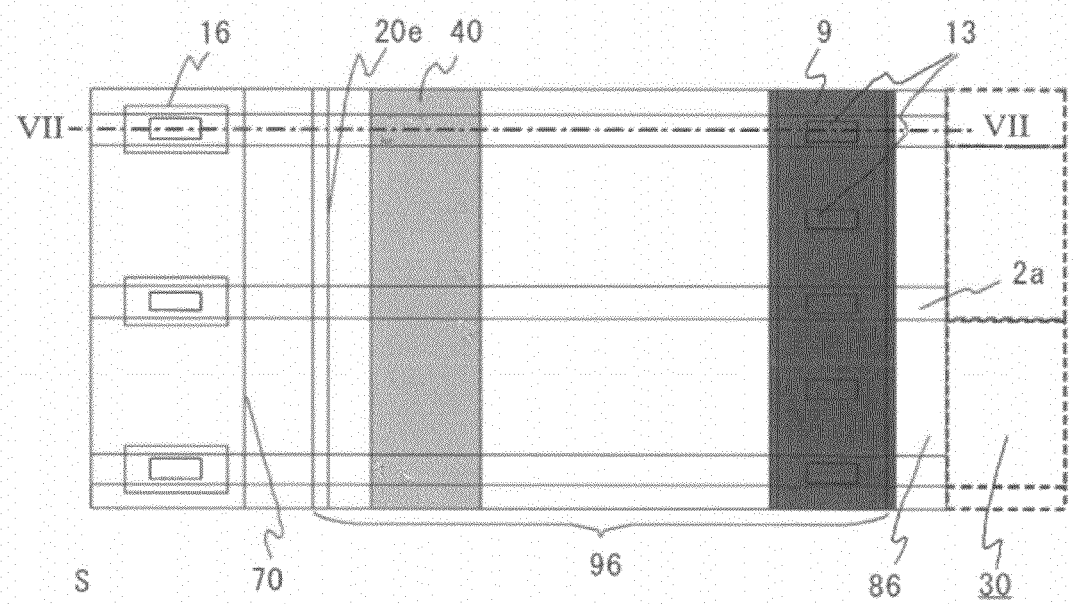
FIG. 6 is an enlarged plan view illustrating an adjacent area S of a seal material of a second illustrative embodiment.
Figure 7:
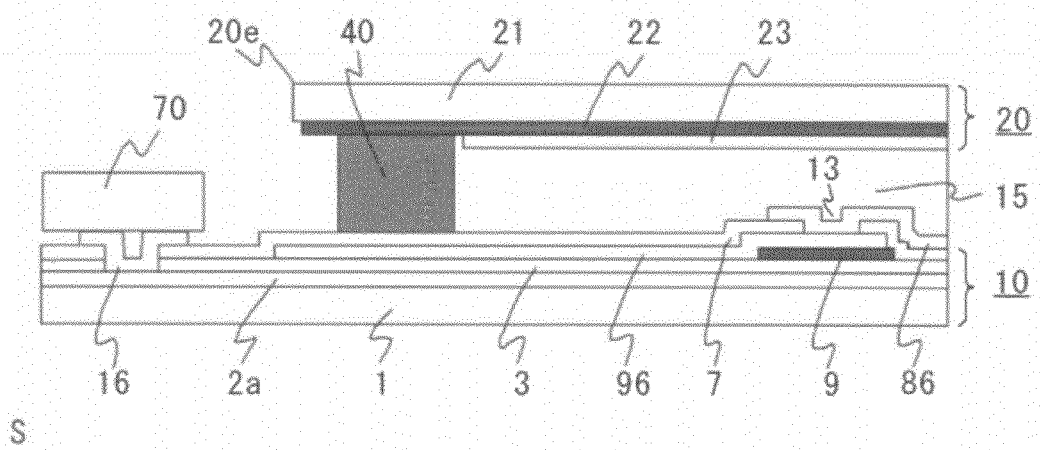
FIG. 7 is a sectional view taken along a line VII-VII of FIG. 6.

FIG. 6 is an enlarged plan view illustrating an adjacent area S of a seal material of a second illustrative embodiment. FIG. 7 is a sectional view taken along a line VII-VII of FIG. 6.

In FIG. 6, the black matrix 22, the overcoat 23 and the like of the opposite substrate 20 are not shown so as to simplify the drawing. The pixels 30 of the display area 50 shown by the dotted line at the right side of FIG. 6 are arranged in a matrix shape, and the detailed configuration of the pixel 30 is equivalent to that of the first illustrative embodiment.

In the second illustrative embodiment, single-layered conductive film 96 is provided similarly to the first illustrative embodiment. However, the conductive film 96 is formed at the same layer as the lower electrode 6 of the pixel electrode of the pixel 30. Similarly to the configuration of the lower electrode 6 and the drain electrode 52, the conductive film 96 is formed and stacked on the common wiring 9 and electrically connected thereto. In the meantime, a part of the conductive film 96 may be formed at the lower layer of the common electrode 9 and electrically connected thereto.

In the transmissive type, the lower electrode 6 made of a transparent oxide conductive film such as ITO. Accordingly, the lower electrode has the corrosion resistance higher than the metal film made of the same layer as the common wiring 9, so that it is possible to further suppress the corrosion of the conductive film 96, compared to the first illustrative embodiment.

Third Illustrative Embodiment

Figure 8:
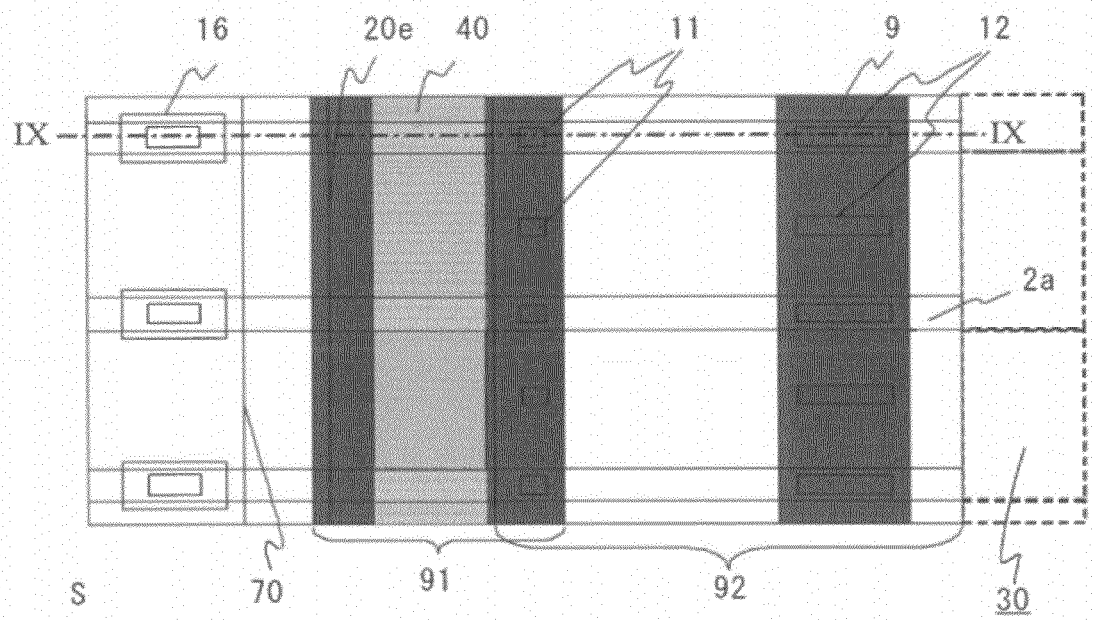
FIG. 8 is an enlarged plan view illustrating an adjacent area S of a seal material of a third illustrative embodiment.
Figure 9:
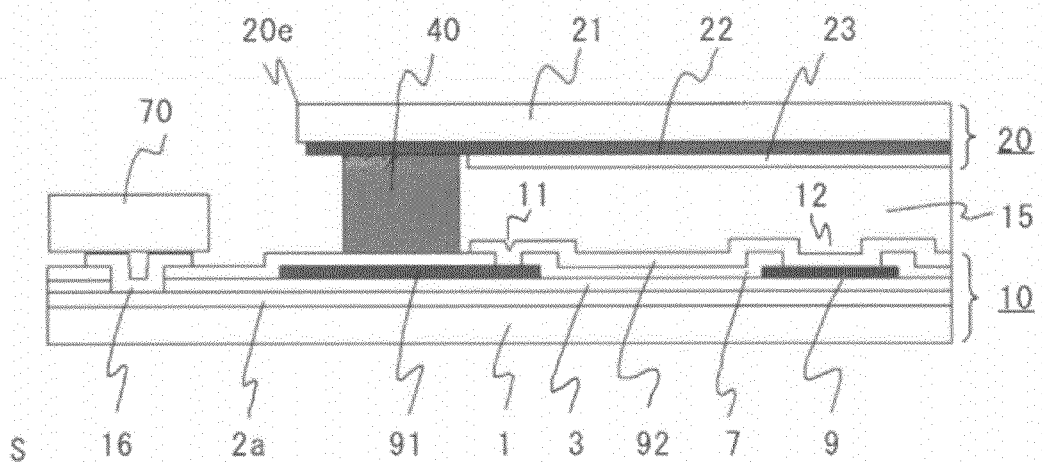
FIG. 9 is a sectional view taken along a line IX-IX of FIG. 8.

FIG. 8 is an enlarged plan view illustrating an adjacent area S of a seal material of a third illustrative embodiment. FIG. 9 is a sectional view taken along a line IX-IX of FIG. 8.

In FIG. 8, the black matrix 22, the overcoat 23 and the like of the opposite substrate 20 are not shown so as to simplify the drawing. The pixels 30 of the display area 50 shown by the dotted line at the right side of FIG. 8 are arranged in a matrix shape, and the detailed configuration of the pixel 30 is equivalent to that of the first illustrative embodiment.

In the first and second illustrative embodiments, single-layered conductive film 90 is provided. However, in the third illustrative embodiment, the conductive film made of a first conductive film 91 and a second conductive film 92 that are formed at different layers. The first conductive film 91 is formed in at least part of the outer area of the seal material 40 and is covered with the protective film 7 that is a second insulating film. The second conductive film 92 is formed on the protective film 7, as a second insulating film, in the inner area of the seal material 40 and is not formed in the outer area of the seal material 40. Also, a junction part between the first conductive film 91 and the second conductive film 92 has an overlapping part in the area of the seal material 40 or inner area of the seal material 40.

The first conductive film 91 is formed at the same layer as the source wiring 5 and the common wiring 9, and the second conductive film 92 is formed at the same layer as the upper electrode 8 of the opposite electrode formed on the protective film 7.

The junction part between the first conductive film 91 and the second conductive film 92 has an overlapping part in the area of the seal material 40 or inner area of the seal material 40, and the first conductive film and the second conductive film are connected through a contact hole 11 provided in the protective film 7. By this configuration, since the second conductive film 92 is formed on the gate extraction wiring 2a in the inner area of the seal material 40, the first conductive film 91 may not be formed except for the adjacency area of the seal material 40, in the inner area of the seal material 40.

Also, the second conductive film 92 is connected to the common wiring 9 through a contact hole 12 provided in the protective film 7. Thereby, the common potential is applied to the first conductive film 91 and the second conductive film 92.

In FIG. 8, the contact holes 11, 12 provided in the protective film 7 are formed in both sides of the common wiring 9 between the adjacent gate extraction wirings 2a. However, the contact holes 11, 12 may be formed in any one of the both sides, as long as the electrical connection can be made. Also, it is possible to suitably design the sizes, shapes and numbers of the contact holes 11, 12.

The junction part between the first conductive film 91 and the second conductive film 92 has the overlapping part, and thus the conductive film on the gate extraction wiring 2a is configured to not be disconnected on the way, as viewed from a plan view. By this configuration, it is possible to substantially shield the electric-field generated from the gate extraction wirings 2a.

In the below, the operations and effects that are obtained as the conductive film is configured with the two layers are described. The first conductive film 91 is formed in at least part of the outer area of the seal material 4 and thus securely shields the electric-field generated from the gate extraction wirings 2a. The area of the conductive film that is formed in at least part of the outer area of the seal material 40 is covered with the protective film 7 so as to suppress the corrosion due to the moistures in the atmosphere. Since the second conductive film 92 is formed in the area or inner area of the seal material 40, it does not contact the moistures in the atmosphere, so that the corrosion is unlikely caused. Accordingly, the second conductive film 92 is formed on the protective film 7, so that a thickness of the insulation film between the gate extraction wiring 2a and the second conductive film 92 is increased. Thereby, the second conductive film 92 shields the electric-field generated from the gate extraction wirings 2a and makes the load capacity of the gate extraction wirings 2a to drive the gate wirings 2 smaller, compared to the first and second illustrative embodiments.

Fourth Illustrative Embodiment

Figure 10:
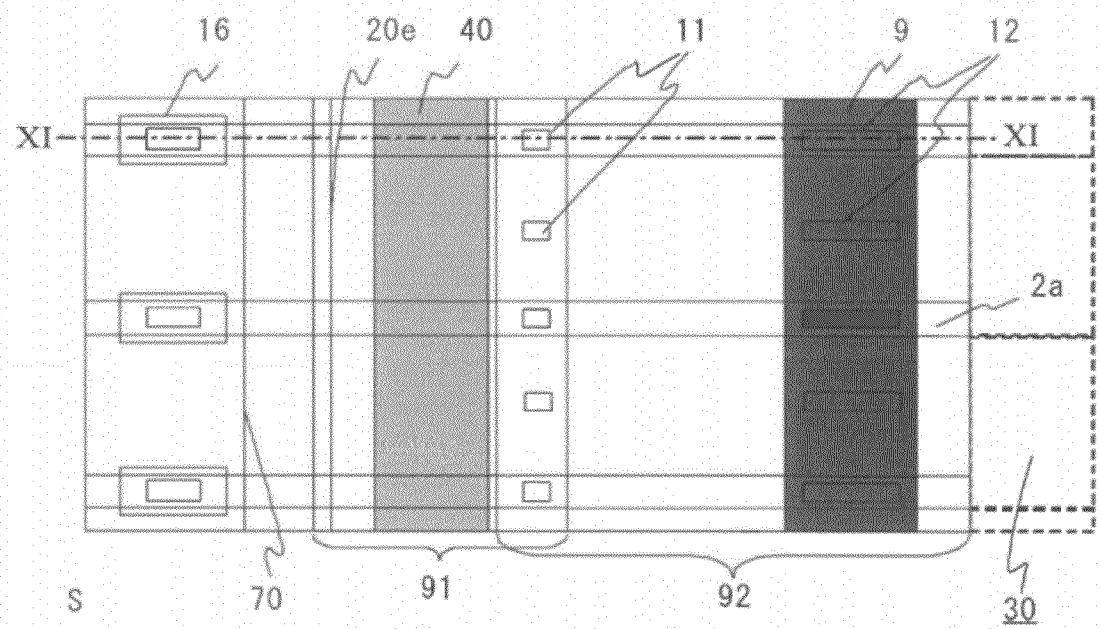
FIG. 10 is an enlarged plan view illustrating an adjacent area S of a seal material of a fourth illustrative embodiment.
Figure 11:
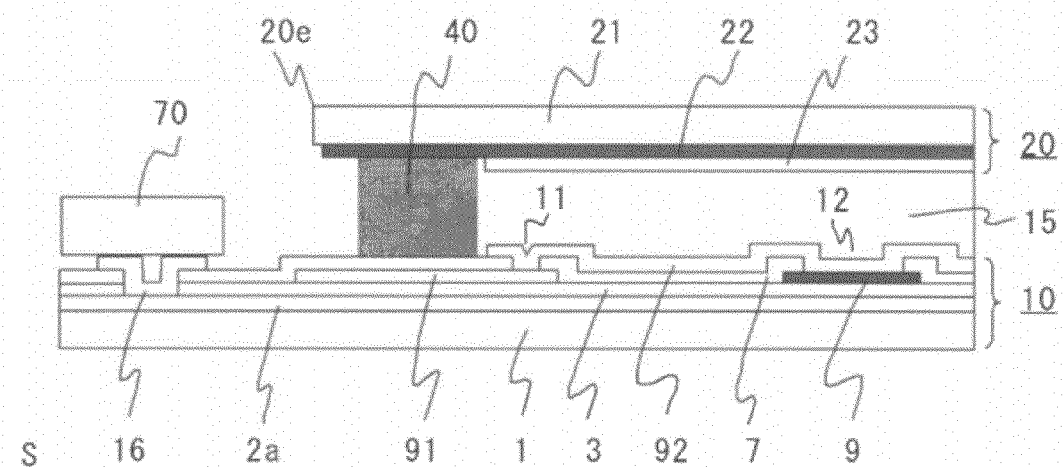
FIG. 11 is a sectional view taken along a line XI-XI of FIG. 10.

FIG. 10 is an enlarged plan view illustrating an adjacent area S of a seal material of a fourth illustrative embodiment. FIG. 11 is a sectional view taken along a line XI-XI of FIG. 10.

In FIG. 10, the black matrix 22, the overcoat 23 and the like of the opposite substrate 20 are not shown so as to simplify the drawing. The pixels 30 of the display area 50 shown by the dotted line at the right side of FIG. 10 are arranged in a matrix shape, and the detailed configuration of the pixel 30 is equivalent to that of the first illustrative embodiment.

The fourth illustrative embodiment has the conductive film having the two-layered configuration similarly to the third illustrative embodiment. However, although the first conductive film 91 is formed at the same layer as the source wiring 5 and the common wiring 9 in the third illustrative embodiment, in the fourth illustrative embodiment, the first conductive film 91 is formed at the same layer as the lower electrode 6 of the pixel 30. At this time, the first conductive film 91 is applied with the same common potential as that of the opposite electrode of the upper electrode 8, not the potential of the pixel electrode of the lower electrode 6.

The second conductive film 92 is formed at the same layer as the upper electrode 8 of the opposite electrode formed on the protective film 7. The second conductive film 92 is not formed in the outer area than the seal material 40. The second conductive film 92 is connected to the first conductive film 91 through the contact hole 11 in the area or inner area of the seal material 40, with partially overlapping with the seal material 40 or without overlapping with the seal material 40.

Also, the second conductive film 92 is connected to the connection part 86 that is formed at the same layer formed by extending the upper electrode 8 from the display area 50. Since the second conductive film 92 is connected to the common wiring 9 through the contact hole 12, the common potential is applied to the upper electrode 8 through the connection part 86.

The first conductive film 91 is the same layer as the lower electrode 6 and made of a transparent oxide conductive film such as ITO, in the transmissive type. Therefore, since the first conductive film has the corrosion resistance higher than the metal film made of the same layer as the source wiring 5 and common wiring 9, it is possible to further suppress the corrosion, compared to the third illustrative embodiment.

Fifth Illustrative Embodiment

Figure 12:
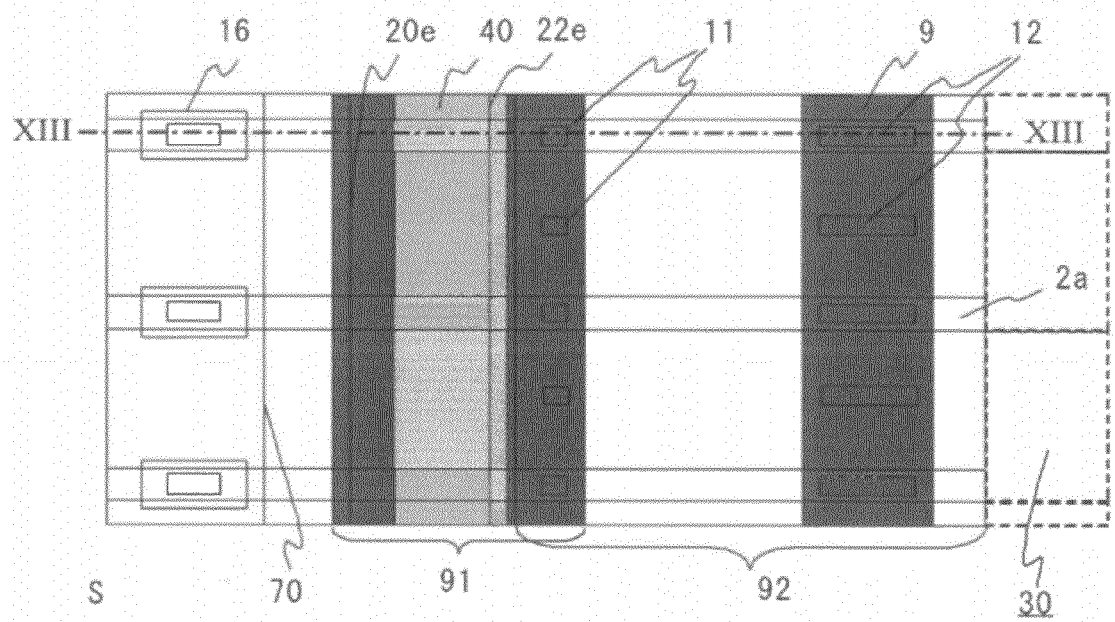
FIG. 12 is an enlarged plan view illustrating an adjacent area S of a seal material of a fifth illustrative embodiment.
Figure 13:
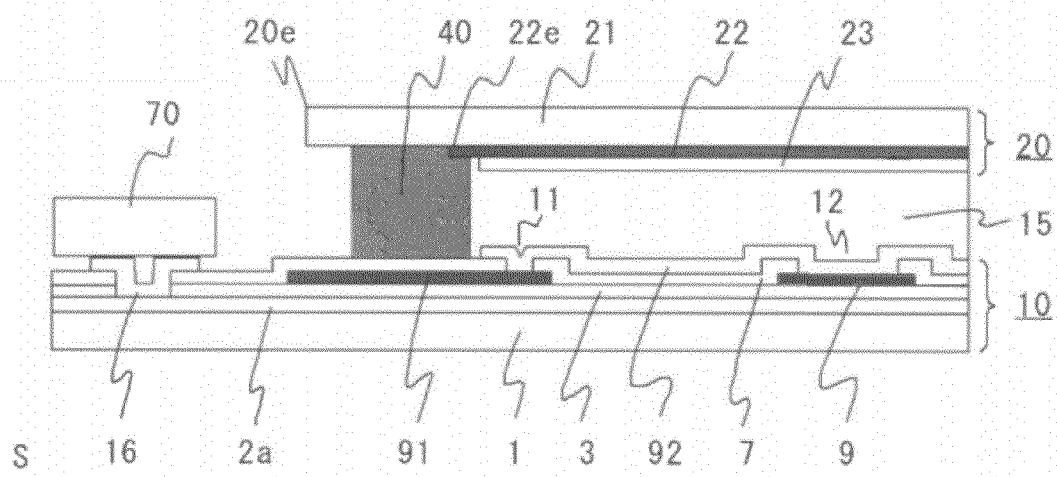
FIG. 13 is a sectional view taken along a line XIII-XIII of FIG. 12.

FIG. 12 is an enlarged plan view illustrating an adjacent area S of a seal material of a fifth illustrative embodiment. FIG. 13 is a sectional view taken along a line XIII-XIII of FIG. 12.

In FIG. 12, the overcoat 23 and the like of the opposite substrate 20 are not shown so as to simplify the drawing. However, an end portion 22e of the black matrix is shown to describe characteristics of the fifth illustrative embodiment. The pixels 30 of the display area 50 shown by the dotted line at the right side of FIG. 12 are arranged in a matrix shape, and the detailed configuration of the pixel 30 is equivalent to that of the first illustrative embodiment.

The fifth illustrative embodiment has the conductive film having the two-layered configuration similarly to the third illustrative embodiment. However, the black matrix 22 of the opposite substrate 20 is not formed over the entire area of the seal material 40, and the end portion 22e of the black matrix is configured to partially overlap with the seal material 40 or to not overlap with the seal material 40.

This is because the first conductive film 91 also functions as the shield film equivalent to the black matrix 22 in an area in which the first conductive film is configured by an opaque conductive film made of the same layer as the source wiring 5 and common wiring 9.

Since the black matrix 22 made of black organic resin is a member that is easy to charge the electricity, it is one cause of the display non-uniformity that occurs in the vicinity of the display area 50, as the opposite substrate 20 causes the potential variation. Therefore, the black matrix 22 on the opposite substrate 20 facing the area made of the opaque conductive film is not formed, if possible, and an area thereof is reduced. Accordingly, the electric-field generated from the gate extraction wirings 2a less causes the potential variation of the opposite substrate 20.

In the meantime, even when the conductive film 90 formed by the single layer, like the first illustrative embodiment, is the opaque metal film made of the same layer as the source wiring 5 and common wiring 9, this disclosure can be applied thereto. Also, the end portion 22e of the black matrix can be arranged up to the adjacency of the common wiring 9 in the inner area of the seal material 40, so that it is possible to further reduce the area of the black matrix 22.

Sixth Illustrative Embodiment

Figure 14:
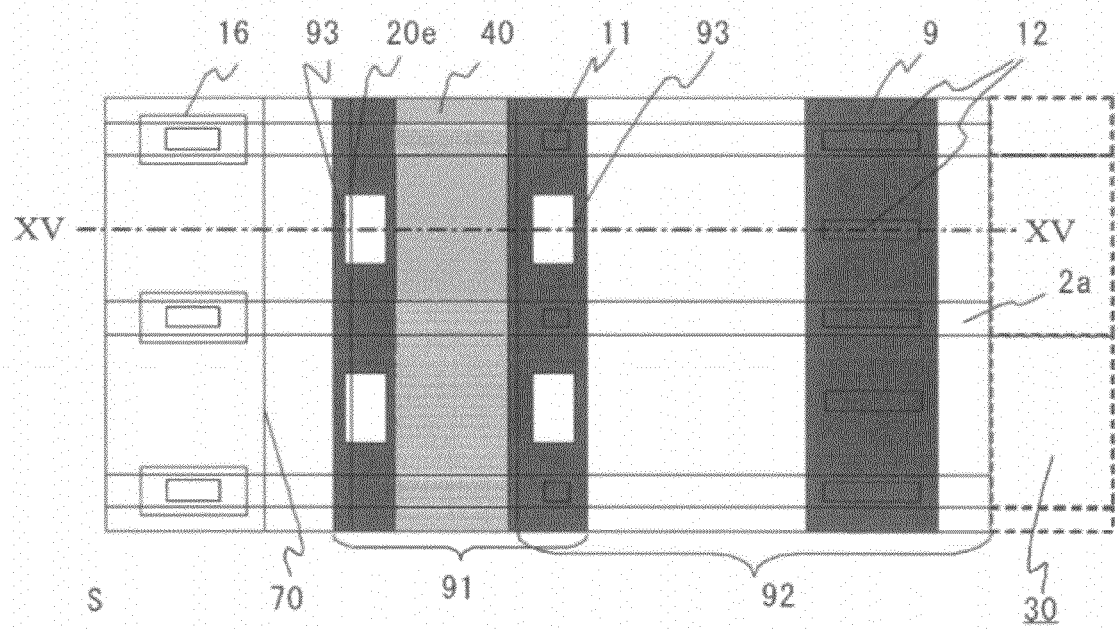
FIG. 14 is an enlarged plan view illustrating an adjacent area S of a seal material of a sixth illustrative embodiment.
Figure 15:
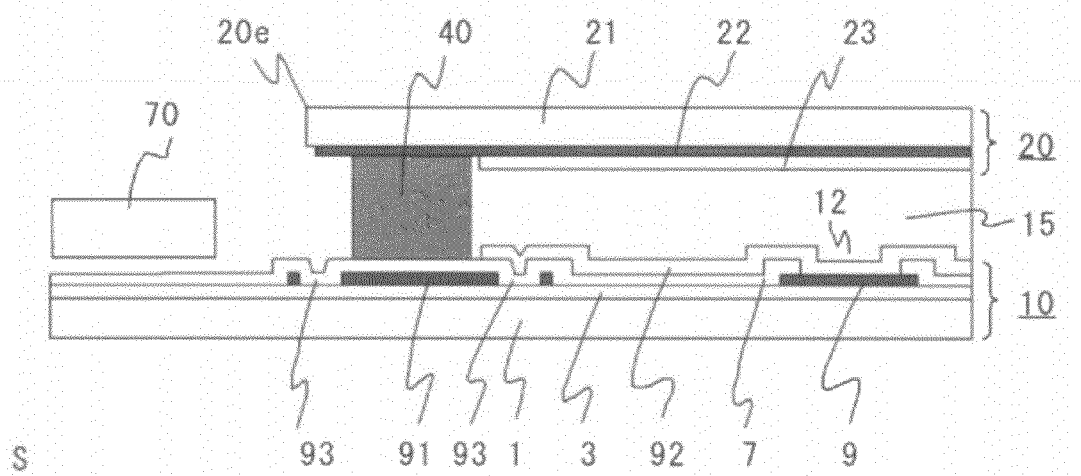
FIG. 15 is a sectional view taken along a line XV-XV of FIG. 14.

FIG. 14 is an enlarged plan view illustrating an adjacent area S of a seal material of a sixth illustrative embodiment. FIG. 15 is a sectional view taken along a line XV-XV of FIG. 14. The line XV-XV is in an area that is not formed on the gate extraction wiring 2a.

In FIG. 14, the black matrix 22, the overcoat 23 and the like of the opposite substrate 20 are not shown so as to simplify the drawing. The pixels 30 of the display area 50 shown by the dotted line at the right side of FIG. 14 are arranged in a matrix shape, and the detailed configuration of the pixel 30 is equivalent to that of the first illustrative embodiment.

The sixth illustrative embodiment has the conductive film having the single-layered or two-layered configuration similarly to the first to fifth illustrative embodiments. However, openings 93 are formed in the conductive film of the areas that are formed not above the gate extraction wirings 2a. Here, based on the third illustrative embodiment, it is shown that the openings 93 are formed in the first conductive film 91 in the outer area and inner area of the seal material 40, which are formed not above the gate extraction wirings 2a. The openings 93 may be formed in any one of the outer area and inner area of the seal material 40. Also, the openings 93 may be formed in the area of the seal material 40.

In the area of the opening 93, the protective film 7 is stacked on the gate insulation film 3 without sandwiching the conductive film therebetween. Accordingly, the adhesion with a base of the protective film 7 is enhanced, compared to the protective film formed on the conductive film, so that the protective film 7 is not peeled off well, and thus the reliability may be further improved.

In the meantime, it is possible to suitably design the size, shape and number of the openings 93 as long as the conductive film may sufficiently shield the electric-field generated from the gate extraction wirings 2a.

In the above illustrative embodiments, the pixel 30 has a configuration in which the lower electrode 6 is the pixel electrode and the upper electrode 8 is the opposite electrode. However, this disclosure can be also applied to a horizontal electric-field type liquid crystal display apparatus having a configuration in which the lower electrode 6 is the opposite electrode and the upper electrode 8 is the pixel electrode. In this case, it is preferable that the second conductive film 92 made of the same layer as the upper electrode 8 is electrically separated from the upper electrode 8 of the pixel electrode in the vicinity of the end portion of the display area 50, and the common potential is applied to the second conductive film 92.

Also, in the above illustrative embodiments, the FFS type has been illustrated, in which the lower electrode 6 is the pixel electrode and the upper electrode 8 is the opposite electrode. However, this disclosure can be also applied to an IPS type liquid crystal display apparatus, in which the lower electrode 6 has a slit shape or pectinate shape.

Also, for an IPS type liquid crystal display apparatus in which the pixel electrode and the opposite electrode are formed at the same uppermost layer, it is preferable that a pattern of the opposite electrode, to which the common potential is applied, is electrically connected to the conductive film, which is the shield electrode, in the vicinity of the end portion of the display area 50.

Also, in the above illustrative embodiments, the TFT has a channel etch inverted staggered type structure. However, this disclosure can be may applied to a horizontal electric-field type liquid crystal display apparatus using a TFT of an etch stopper inverted staggered type, a top gate type and so on.

Also, in the above illustrative embodiments, it has been illustrated that the driving circuit is COG-mounted. However, this disclosure can be also applied to a horizontal electric-field type liquid crystal display apparatus, in which a driving circuit is Tape Automated Bonding (TAB)-mounted or a driving circuit formed by TFTs is embedded on the array substrate 10, as long as the gate extraction wirings 2a are formed in the outer area of the seal material 40.

What is claimed is:
1. A liquid crystal display apparatus comprising:
an array substrate that has a display area;
a seal material that is formed to surround the display area; and
an opposite substrate that is arranged to face the array substrate with sandwiching liquid crystals therebetween, the liquid crystals being sealed in an area surrounded by the seal material,
wherein the array substrate includes
a plurality of thin film transistors that is formed in correspondence to respective intersection parts of a plu- rality of gate wirings and a plurality of source wirings arranged in the display area;

a pixel electrode that is connected to the thin film transistor;

an opposite electrode that is formed to face the pixel electrode;

a gate extraction wiring that connects one of the plurality of gate wirings and a connection terminal formed in an outer area that is outside of the area surrounded by the seal material;

a conductive film that covers the gate extraction wiring with sandwiching a first insulation film therebetween, in part of the outer area, the conductive film includes an opaque conductive film that functions as a light shielding film without light transmitting regions or openings, and the opaque conductive film extends from the outer area, below the seal material, and into the area surrounded by the seal material; and a second insulation film that covers the conductive film in at least part of the outer area, and wherein the conductive film is applied with an electrical potential of the opposite electrode, and the liquid crystal display apparatus is a horizontal electric-field type.

2. The liquid crystal display apparatus according to claim 1, wherein the conductive film has a first conductive film and a second conductive film, wherein the first conductive film is formed below the second insulation film in at least part of the outer area, wherein the second conductive film is formed above the second insulation film in at least part of the area surrounded by the seal material and is not formed in the outer area, and wherein a junction part between the first conductive film and the second conductive film has an overlapping part.

3. The liquid crystal display apparatus according to claim 2, wherein the first conductive film is formed at the same layer as the source wirings, and wherein the second conductive film is formed at the same layer as a layer above at least one of the pixel electrode and the opposite electrode.

4. The liquid crystal display apparatus according to claim 2, wherein the first conductive film is formed at the same layer as a layer below at least one of the pixel electrode and the opposite electrode, and wherein the second conductive film is formed at the same layer as a layer above at least one of the pixel electrode and the opposite electrode.

5. The liquid crystal display apparatus according to claim 2, wherein the first conductive film and the second conductive film are connected in at least one of an area of the seal material and the area surrounded by the seal material.

6. The liquid crystal display apparatus according to claim 1, wherein the conductive film is formed to extend toward the connection terminal beyond a position of an end portion of the opposite substrate in the gate extraction wiring-side, in the outer area, as viewed from a plan view.

7. The liquid crystal display apparatus according to claim 1, wherein a black matrix in the opposite substrate is not formed at an area that faces an area of the opaque conductive film.

8. The liquid crystal display apparatus according to claim 1, wherein the conductive film is covered by the second insulation film in an area of the seal material above the gate extraction wirings.

9. The liquid crystal display apparatus according to claim 1, wherein the conductive film is connected to the same layer as the opposite electrode in the vicinity of an end portion of the display area in the gate extraction wiring-side.

10. The liquid crystal display apparatus according to claim 1, wherein the conductive film is formed to extend toward the connection terminal beyond a position of an end portion of a black matrix on an opposite substrate in the gate extraction wiring-side, in the outer area, as viewed from a plan view.

11. The liquid crystal display apparatus according to claim 1, wherein a black matrix is made of organic resin.

12. The liquid crystal display apparatus according to claim 1, wherein no electrode is provided on a liquid crystal side surface of the opposite substrate.

13. The liquid crystal display apparatus according to claim 1, wherein a black matrix in the opposite substrate is not formed at an area that faces the opaque conductive film below the seal material.

* * * * *